Patented Dec. 24, 1935

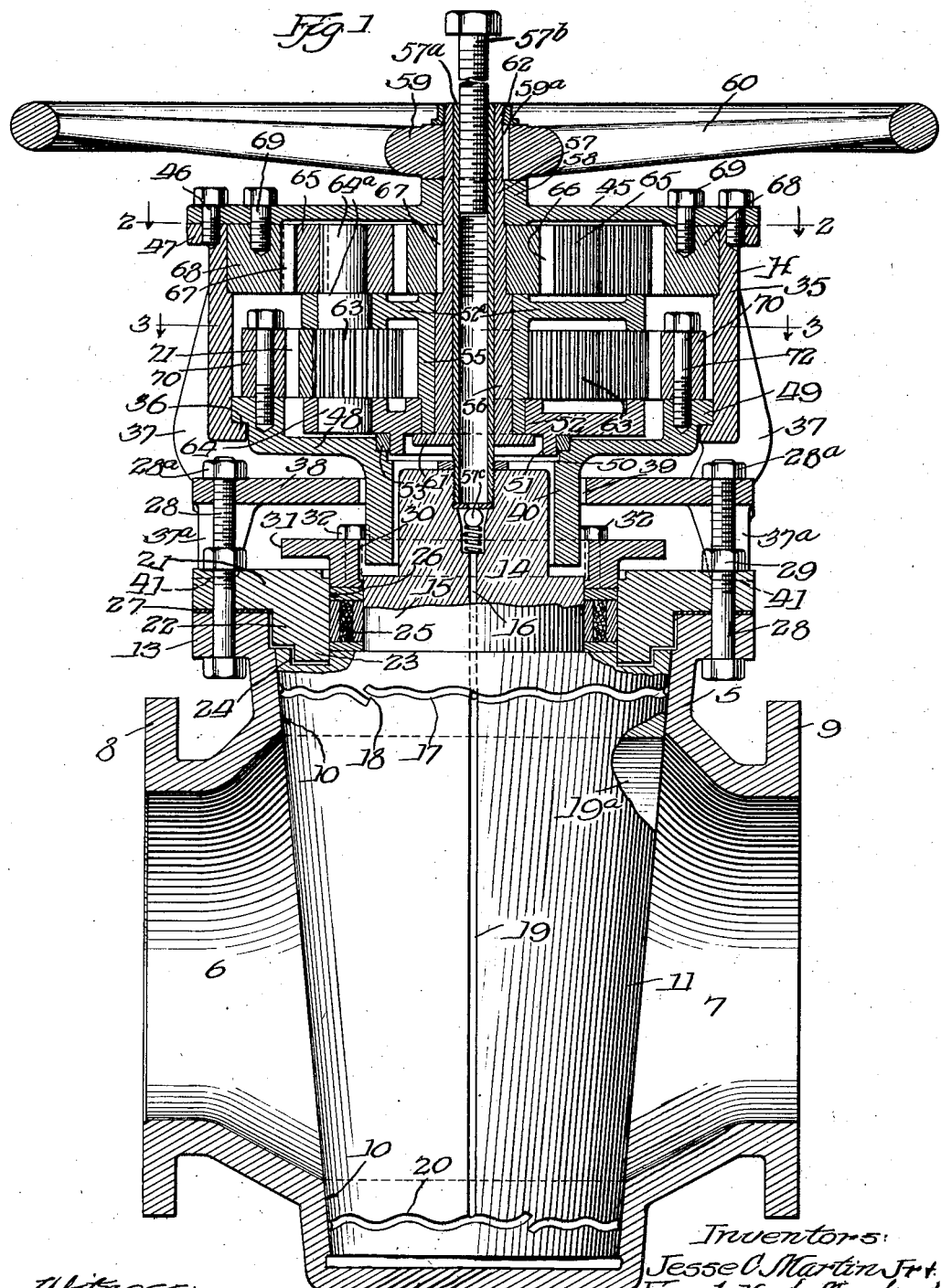

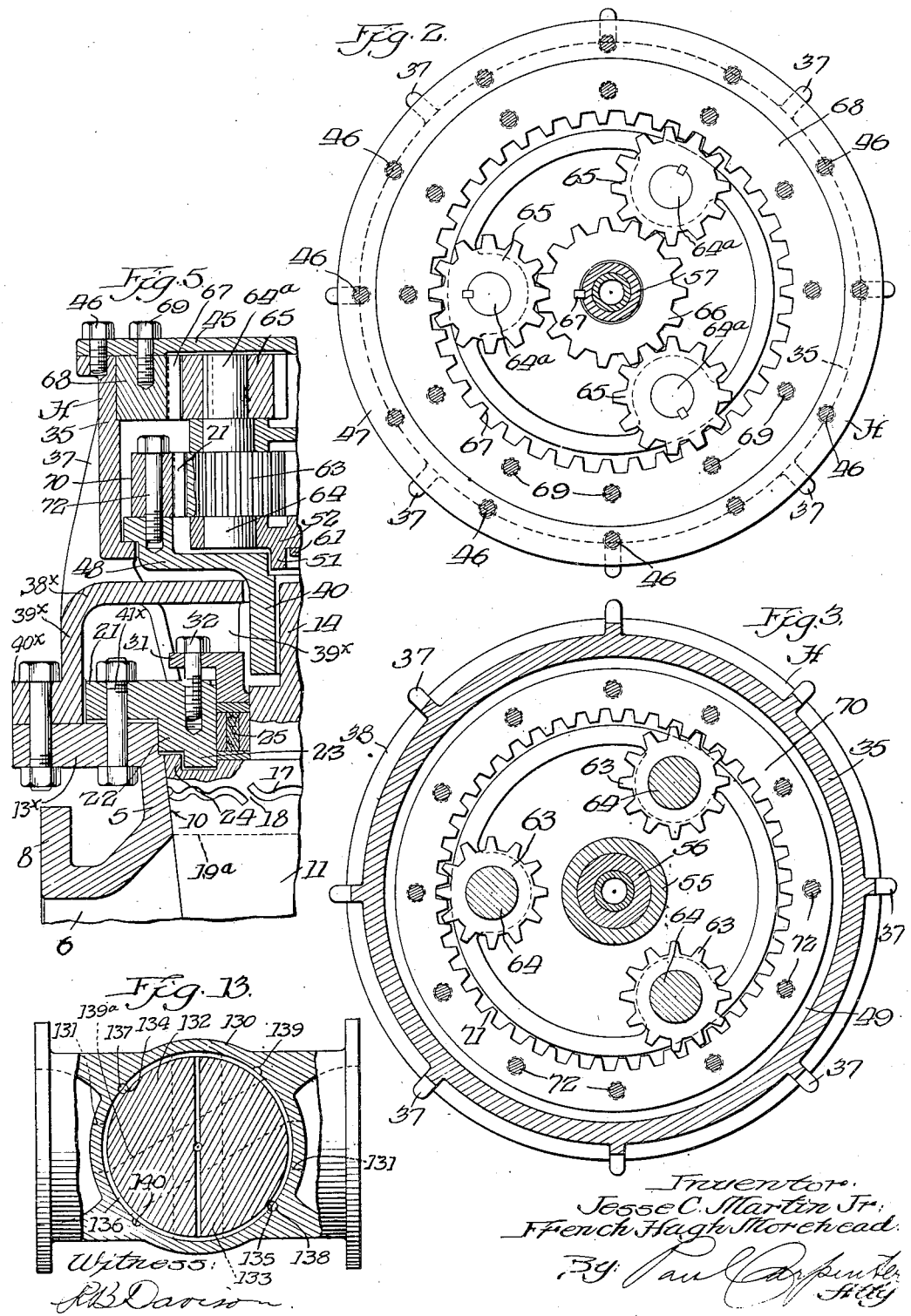

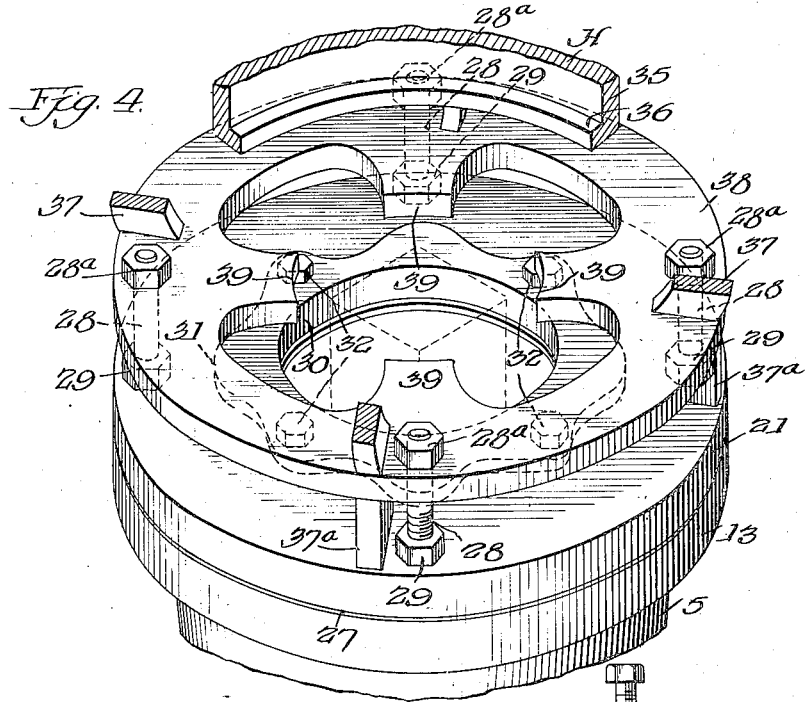
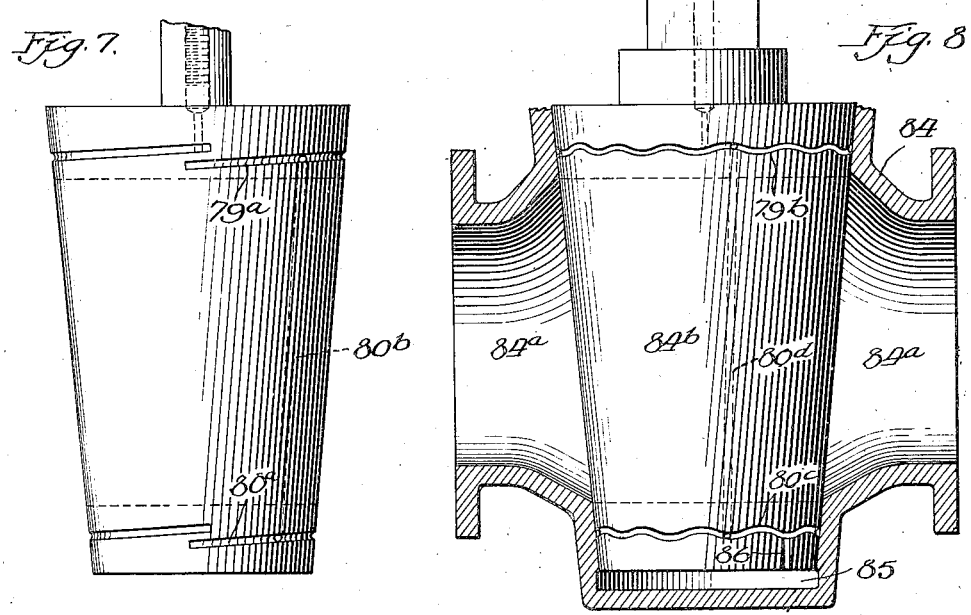

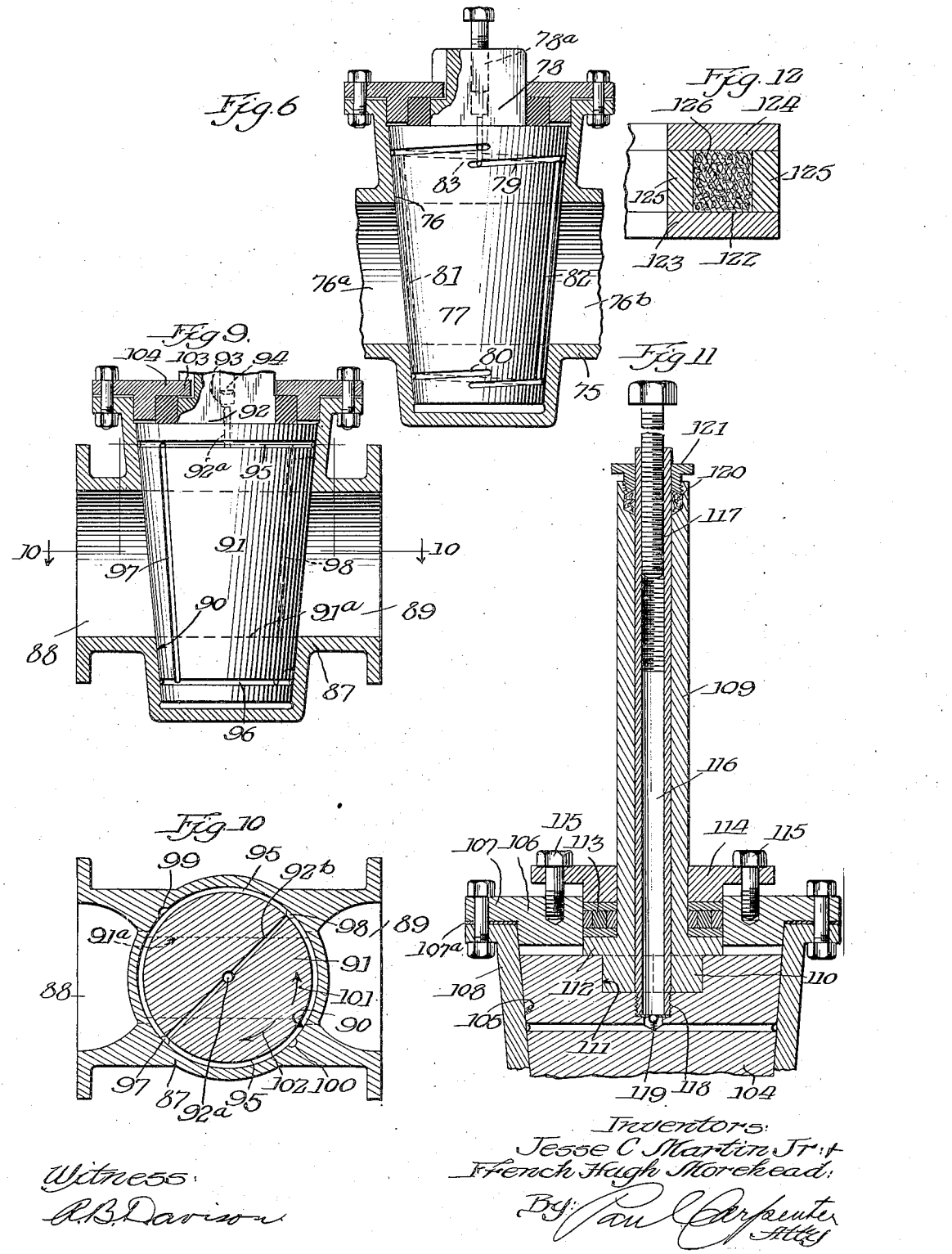

2,025,244

UNITED STATES PATENT OFFICE 2,025,244

VALVE AND VALVE OPERATING MECHANISM

French Hugh Morehead, Brookline, Mass., and Jesse C. Martin, Jr., Los Angeles, Calif., assignors to Walworth Patents, Inc., Boston, Mass., a corporation of Massachusetts Application August 6, 1931, Serial No. 555,594

24 Claims. (Cl. 251—91)

This invention relates in general to valves, and, more particularly, to improved means for lubricating and for operating such valves, the invention having special utility in connection with valves commonly known as turning plug valves though, while the particular embodiment of the invention illustrates such a valve, it will be understood that the operating mechanism disclosed is susceptible of modification, within the terms of the invention for adaptation to other purposes.

One of the principal objects of the present invention resides in the provision of an improved form of valve operating mechanism, particularly adapted for employment in imparting rotation to the plug member of a rotary plug valve of such character that the mechanism may be bodily applied to existing types of plug valves in one of its forms for facilitating manual operation of the valve; it being understood that in some installations relatively large plug valves are now employed in the place of gate valves, and such plug valves are of a size which prohibits convenient operation of them without interposing some operating means for increasing the purchase or leverage exerted by the operator, the structure of the present invention, from the standpoint of the valve operating mechanism, also permitting of the adaptation thereof to the employment of power means for attachment thereto, if desired.

This invention is further characterized by the provision of an improved form of valve operating mechanism adapted to be attached as a unit to a valve to be operated thereby, including an improved arrangement of gearing for imparting movement from a manually operable element to the valve member, wherein the elements of said gearing are confined to a convenient space and are properly housed to permit of the employment of lubricant, if desired, surrounding the gearing and/or to prevent ingress of dust and other foreign matter; and the provision of an improved operating mechanism for rotary plug valves and the like which serves to form a compact power transmission means permitting of a relatively large ratio of the leverage between the manually operated element and the valve itself and permits of the installation of the valve in positions which ordinarily would prohibit the operation of the valve by a lever due to the lack of space; the provision of valve operating mechanism which permits of a relatively fine degree of adjustment of the valve by multiplication of the travel of the valve operating mechanism; and the provision of an improved valve operating mechanism of the character referred to which may be so designed as to have substantially the same transverse dimensions as that of the valve housing, and thus occupy little or no more space than that occupied by the valve itself.

This invention has for further objects the provision of an improved means for lubricating the valve itself, which lubricating means may conveniently extend through the gear housing and not interfere with the gearing or manually operating means therefor; the provision of an improved arrangement of the lubricating ducts in the surfaces of contact of the valve and its seat, where a lubricated plug valve is employed; the provision of an improved arrangement of lubricating means for plug valves, generally, with reference to the valve structure per se, and the lubricant compressing means as well as to the improved groove arrangement employed for conducting lubricant to the seating surfaces of the valve.

This invention also provides, in combination with the other features and standing alone, an improved means for packing a plug valve and which will permit of renewal of the packing while the valve is in service.

The foregoing and such other objects and advantages as may appear or be pointed out as this description proceeds are attained in the structural embodiments of the invention illustrated in the accompanying drawings, in which:

Figure 1 is a sectional and elevational view of a valve and operating mechanism therefor incorporating the features of our invention;

Figure 2 is a transverse sectional view, taken on the lines 2—2 of Figure 1 looking in the direction indicated by the arrows;

Figure 3 is a view similar to Figure 2, taken on the line 3—3 of Figure 1 looking in the direction indicated by the arrows;

Figure 4 is a fragmentary perspective view of the device shown in Figure 1;

Figure 5 is a fragmentary view similar to Figure 1 illustrating an alternative form of the invention;

Figure 6 is a schematic elevational view of a plug valve member illustrating a modified form of the lubricant groove arrangement;

Figure 7 is a sectional elevational view of a further modified form of the invention;

Figures 8 and 9 are sectional elevational views similar to Figure 6 of further alternative forms of this invention;

Figure 10 is a sectional view taken on the lines 10—10 of Figure 9 looking in the direction indicated by the arrows;

Figure 11 is a still further modified form of the present invention illustrated in section; and Figure 12 is an enlarged sectional view of a form of packing for employment in the device of this invention.

Figure 13 is a sectional view of a further modified form of this invention.

Referring now more particularly to the drawings, and first to the form of the invention shown in Figures 1, 2, and 3, 5 indicates a valve housing which latter is provided with transverse passageways for fluid, 6 and 7, bordered by flanges 8 and 9 for attaching the valve casing in a pipe line.

The valve casing 5 is provided with a tapered valve seat 10 which extends transversely of the passageways 6 and 7 and is adapted to receive a generally tapering turning plug member 11.

From the aspect of Figure 1, the bottom of the casing, that is, at the smaller end of the valve seat 10, is closed, as at 12, and the upper end, as viewed in Figure 1, is open and provided with an annular flange 13 which serves to receive closing and sealing means for the valve and, as well, to support the valve operating mechanism hereinafter described.

For valves of this character, wherein lubricating means for the valve member itself is to be employed, there are several arrangements of grooves in the surfaces of contact between the valve and its seat which may be employed for conducting lubricant to surfaces, one of these forms of grooves as shown in Figure 1. In this instance the valve member is provided with an operating stem or extension 14 which is adapted to project beyond the closing means of the valve casing and is provided with an enlarged portion 15 which forms one of the walls of a stuffing box hereinafter to be described. The stem 14 is provided with an axial opening 16 which communicates, by the provision of radial openings within the plug, with a circumferential sinuated groove 17 which, for present purposes, is shown to be in the surface of the plug, but it will be understood that this groove may be formed in the valve seat if desired. The groove 17 is interrupted and is non-continuous by virtue of the land 18, there being a complemental land diametrically oppositely to the land 18 but not appearing in the drawing. This groove 17 is situated above the edges of the passageways 6 and 7 so that there is no communication established between the said groove and said passageways under normal conditions. The plug member may also be provided with a longitudinal groove 19 which communicates with a complemental sinuated groove 20 near the smaller end of the plug member and below the edges of the passageways 6 and 7, as viewed in Figure 1. Alternative forms of this groove arrangement are described hereinafter.

The valve casing, at the larger end of the plug member, is closed by a valve retaining ring or flange member 21, said flange member having an annular abutment portion 22 provided with a reduced annular portion 23 so that said flange 22 overlies the larger end of the plug and the annular extension 23 lies within a complemental groove 24 formed in the adjacent end face of the plug member.

The inner peripheral surface of the flange 22 is spaced from the portion 15 of the stem 14 so as to afford a stuffing box in which a packing 25 is deposited, this packing being of a resilient character able to retain its resiliency and withstand the corrosive or other destructive actions of fluids passing through the valve or compression thereof for holding the valve on its seat.

It will be observed that the inner peripheral surface 26 of the flange 22 relatively snugly engages the adjacent surface of the groove 24 in the valve member so that the packing will not be allowed to escape from the stuffing box between the flange 22 and the valve member. However, the portion 23 of said flange 22 and said flange itself are spaced from the valve at other points so as to permit of a slight axial movement thereof off its seat in response to lubricant under pressure forced into the grooves 17, 19 and 20 for lubricating the valve and its seat. In order to prevent the escape of fluid from the valve, and to form a seal, a suitable gasket, preferably of a resilient material indicated at 27, may be interposed between the ring 21 and the flange 13. This ring 21 and flange 13 are brought into compressed engagement with the gasket 27 by the provision of elongated bolts 28 which serve the dual function of securing the ring 21 on the casing and also for securing the valve operating mechanism bodily thereon as will hereinafter appear, a plurality of these bolts being provided and having nuts 29 which, when tightened down on the ring 21, serve to retain said ring in the position shown in Figure 1.

The packing 25 is compressed in its stuffing box by the provision of a gland 30 having annular flange 31 through which a series of cap screws 32 extend, secured in the ring 21 and having heads thereon which permit of tightening the gland for compressing the packing 25. It will be observed that this packing acts directly against the valve and, therefore, tends to keep it on its seat, but will permit of the raising of the valve from its seat in response to lubricant pressure in the grooves and will then return it to its seat with a thin film of lubricant between the valve and the said seat, thus forming an adequate seal around the openings or passageways 6 and 7.

It will be observed that the valve structure so far described, without the valve operating mechanism presently to be described, will function manually, that is, by applying a wrench to the stem 14 which latter is squared for this purpose. The valve may be rotated in its seat to bring the passageway 19a therein into or to move it out of registration with the passageways 6 and 7. Thus, in an emergency, the entire valve operating mechanism presently to be described may be removed and the valve manually operated by directly applying a lever and wrench to the stem 14.

The valve operating mechanism includes generally a housing H which has a substantially cylindrical wall 35 so that said housing, without the other parts presently to be described, is open at both the top and bottom thereof, the inner or bottom edge of the wall 35 being provided with an annular track flange 36 for a purpose which will presently appear.

The cylindrical wall 35 of the housing 8 is provided with a plurality of legs 37 extending parallel to the longitudinal axis of said cylindrical housing and being joined intermediate their ends by an annular flange 38, it being understood that, while these elements form a substantially continuous casing, they may, for some purposes, be made separate casings. The annular flange 38 is provided at spaced points with a plurality of radial inwardly directed lugs 39 which are presented with their inner ends adjacent to a spider element which has an opening in the form of a wrench square for engaging the stem 14, this spider element being designated 40 and being carried by other elements to be hereinafter described. These lugs 39 tend to prevent any lateral distortion of the element 40 in the operation of the mechanism. The flange 38 is apertured to receive the upper ends of the bolts 28, and nuts 28a overlie said flange so as to bring the foot portions 37a of the legs 37 into abutting relationship with the ring 21, the latter having a plurality of complemental recesses shown in dotted lines at 41 in Figure 1 so that rotation of the flange 38 or lateral displacement of the legs 37 relatively to the ring 21 is prevented. The recesses 41 are not absolutely necessary, and, in instances of installation of the valve operating mechanism, the bolts 28 will, of course, be made of such size and strength as to resist any tortional strain or twisting which may tend to occur.

From the foregoing it will be observed that the housing H is supported as a separate entity upon the valve casing and in spaced relationship thereto. This spaced relationship is such that the stud bolts 32 are positioned with respect to the bolts 28 in such manner that they may be reached from outside the valve by a suitable wrench for adjusting the gland 30 without disturbing the other elements. In fact, the space between the outer surface of the ring 21 and the inner surface of the flange 38 is such as to permit of removal of the bolts 32 and removal of the gland upwardly or outwardly to permit of the insertion of a new packing without taking the casing H off the valve. However, the preferred manner of repacking the valve is to remove the nuts 28a and thus bodily lift the gear housing, with all of the associated mechanism therein, clear of the valve entirely.

The top of the gearing housing H is closed by a closure plate 45 which is bolted thereupon by the provision of bolts or the like, 46, extending through said plate and into a suitable flange 47 formed on the wall 35 of said housing.

The gearing within the housing and the operating shaft and associated elements, all with the exception of one of the ring gears, are retained in operative position by a bottom closure member 48 which is formed integrally with the extension member 40 already described, this latter member having an internal cylindrical surface and being internally squared as set forth.

The closure member 48 is provided with a peripheral flange 49 affording a shoulder which rests upon and is rotatable relatively to the flange 36 on the wall 35 of the housing H. The center squared opening in the extension 40 at its upper portion is provided with an annular shoulder 50 in which the hub portion 51 of a lower or inner intermediate spider 52 is rotatable, a suitable packing 53 being provided adjacent to the hub 51 so that, if desired, a lubricant may be contained in the housing H in which the gearing is adapted to run. The spider 52 is thus supported for rotation relatively to the closure member 48. The closure member 52 is further provided with an axial tubular extension 55 which receives the lower enlarged end 56 of the operating shaft 57, which latter extends upwardly through a bearing 58 in the closure plate 45 of the housing and is operatively connected for rotation with the hub portion 59 of a hand wheel 60. The lower or inner end of the shaft 57, that is, the enlarged portion 56 thereof, is provided with a laterally extending enlargement 61 which underlies the tubular extension 55 and spider 52 and, by virtue of the enlargement 61 and the hub 59 of the hand wheel, the plates are held in assembled position. The hub 59 is keyed to the shaft 57, as indicated at 59a, and a retaining nut 62 is adapted to have threaded engagement with the projecting part of the hollow shaft 57.

The shaft 57 rotates upon the bearing formed by a tubular liner 57a which at one end threadedly engages the stem 14 of the valve member, and at the other end has a compressor screw 57b mounted thereon. A suitable check valve 57c is positioned in the stem 14 adjacent the end of the liner 57a.

The tubular extension 55 of the spider 52 and said spider serve as supporting means for a lower or inner set of planet pinions 63, said pinions being carried on stud shafts 64 mounted in the portions 52 of the spider and the outer or upper portions 52a thereof. The shafts 64 are extended beyond the outer or upper portions 52a of the spider, as indicated at 64a, to receive in each instance outer or upper planet gears or pinions 65.

The intermediate portion of the hollow shaft 57 is provided with a sun gear 66 which latter is keyed at 67 to the adjacent portion of the hollow shaft 57, and said sun gear meshes with the series of pinions 65. These pinions in turn mesh with the teeth 67 of a ring gear 68 secured to the inner wall surface of the housing H by the provision of bolts or screws 69 extending through the closure plate 45. This ring gear 68 is fixed against rotation within the housing.

Below the ring gear 68, and carried by the spider 48, we provide an axial rotatable ring gear 70 whose teeth 71 mesh with the series of planet pinions 63. The ring gear 70 is fixedly attached to the flange portion 49 of the closure member 48 by the provision of a series of cap screws or bolts 72.

By the provision of the gearing described herein, we are enabled to obtain a lever ratio from the hand wheel to the power exerted on the valve member of about 95 to 1, the gearing forming a compound epicyclic train of gearing so that, for one foot pound of energy exerted on the hand wheel 60, we are enabled to obtain approximately 95 foot pounds of energy exerted on turning the valve in its seat. This is due to the provision of the two ring gears 68 and 70 relatively rotatable and the two sets of pinions 63 and 65.

The arrangement of the teeth of the gears and their relative sizes shown in the drawings will be understood to be purely exemplary and not strictly accurate as to teeth numbers and gear sizes, and it will be understood, however, that by the provision of two ring gears and two sets of planet gears we are enabled to obtain a much larger ratio in a smaller space than has been possible with other forms of gearing for this purpose, such, for example, as in the form shown in the patent to Martin, 1,756,650.

From an inspection of Figures 1, 2 and 3, it will be understood that the direction of rotation of the hand wheel 60 and the direction of rotation of the valve are the same, that is to say, clockwise rotation of the hand wheel 60 will cause clockwise rotation of the valve member so that the valve may be made to operate by the hand wheel in the conventional manner. If desired, this may be varied by reversing the pinions 63 and 65, that is, having the smaller pinion 63 engage the stationary ring gear, in which event this ring gear will be smaller than the complemental ring gear. In this instance, the direction of rotation of the valve member will be opposite to that of the hand wheel.

In Figure 5 the structure is similar to Figure 1, but in this instance the portion 38x is extended and formed with legs 39x connected to a base flange 40x which seats directly on the extended or widened flange 13x of the valve body. The member 21, for retaining the valve in its seat is held in position by a series of bolts 41x, and these bolts may be reached through the spaces between the legs 39x.

While this invention is, as already pointed out, in so far as valve operating mechanism is concerned, capable of general application, it finds particular utility in connection with lubricated plug valves and any conventional form of this type of valve may be operated by the gearing already described. However, we have several forms of lubricated plug valves which are particularly suited to an installation in which the planetary gear mechanism is employed for operating same and these forms of lubricated plug valves are illustrated in the accompanying drawings, Figures 6 to 11 both inclusive.

Referring to Figure 6, we have shown a valve structure including a casing illustrated in fragmentary form indicated at 75 having a tapered valve seat 76 and transverse fluid passageways 76a and 76b.

This valve seat receives a rotatable plug member 77 provided with a stem 78 in which a lubricant containing chamber 78a may be provided. This chamber 78a has the usual compression screw therein and is in communication with grooves in the surfaces of contact between the valve and its seat. In this form of the invention, the grooves include two spiral transverse grooves 79 and 80 formed in the seating surface of the plug member, though it will be understood that these grooves may equally well be provided in the seat above and below the passageways 76a and 76b. Communication is established between the grooves 79 and 80 and the lubricant chamber by the provision of ducts 81 and grooves 82 which may be provided either in the seating surface of the valve or in the valve seat as desired. It will be observed that the spiral grooves 79 and 80 are non-continuous and are of somewhat the same nature as the sinuous grooves shown in Figure 1. These grooves 79 and 80 afford means for evenly distributing the lubricant over the seating surfaces of the valve and its seat and at the same time prevent the formation of lands in either of the surfaces of contact between the valve and its seat. While the grooves 79 and 80 are shown as non-continuous, it will be understood that they may be made continuous by the provision of communicating grooves indicated in dotted lines in 83 of Figure 6. The advantage of the sinuated grooves and the spiral grooves is that owing to the constantly changing position of these grooves, with respect to an adjacent surface when the valve is rotated, whether they are in the valve seat or in the valve member, the formation of lands in either the valve member or its seat, as the case may be, is prevented and a more even wearing of the valve and its seat is afforded.

A further distinct advantage more particularly attained in the manufacture of the valve in the employment of the sinuated grooves resides in the fact that when lapping the valve member in the valve seat in preparing the surfaces of contact therebetween, the formation of a circumferential ringing of the lapped surfaces is prevented, this occurring in lapped valve surfaces heretofore known to us, inasmuch as the lapping abrasive in the prior art formation of the grooves is carried in a continuous path at substantially right angles to the axis of the plug. Such rings as are formed between the lapped surfaces under these circumstances require removal to insure fluid tightness before the valve can be considered as finished for service, and it will be understood that this entails a material extra cost in production of the valves. This is eliminated by the provision of the sinuated grooves inasmuch as the objectionable abrasive action against the lapped surfaces producing ringing may be said to be dissipated to alternate bearing surfaces residing on either side of the sinuated groove as provided in our invention.

As a further alternative form of the invention shown in Figure 6, reference may be had to Figure 7. Here the grooves 82 are omitted and communication established between the grooves 79a and 80a by the provision of internal ducts 80b formed within the plug member. It will be understood that in the event that the grooves 79a and 80a are provided in the valve seat, then the ducts 80b may be formed in the valve body, if desired.

As an alternative form of the sinuated grooves shown in Figure 1, we have illustrated the form shown in Figure 8. Here the valve casing 84 has passages 84a controlled by the port in the plug member 84b, and the grooves 79b and 80c are connected by the internal duct 80d provided in the plug member 84b. As a still further alternative form the valve casing or body 84 may be provided at the smaller end of the plug with the chamber 85 which is placed in communication with the groove 80c by the provision of a groove or port, as desired, indicated at 86. This will thus admit lubricant under pressure to the chamber 85 and serve as a balancing means for the valve member in its seat.

It will be understood that the same form of packing illustrated in Figure 1 may be employed in any of the forms of the invention shown in any of Figures 6 to 10.

Figures 9 and 10 illustrate a further alternative form of the groove arrangement in which a framing lubricant seal of the fluid passageways through the body by the lubricant material is provided, this being accomplished by the arrangement of the grooves in all positions of the valve member from full open to full closed position without exposing any of the grooves in either the valve or plug member or in the body to the fluid passing through the valve passages.

Referring now in detail to Figures 9 and 10, the valve casing 87 is provided with fluid passageways 88 and 89 and the valve seat 90 intersecting said passages, said valve seat being tapered in form and receiving a complementally formed rotatable plug member 91. The plug member 91 is provided with a stem 92 having a lubricant chamber 93 in which a compressor screw 94 is provided, said lubricant chamber communicating with transverse and longitudinal grooves in the surfaces of contact between the valve member 91 and its seat 90.

In this arrangement of the grooves, the plug member is provided above and below the passageways 88 and 89 with substantially continuous circumferential grooves 95 and 96, so that these grooves are out of communication with the passageways 88 and 89 at all times. The groove 95 is placed in communication with the lubricant chamber 93 by the provision of ducts 92a and 92b and the grooves 95 and 96 are placed in communication with each other by the provision of diametrically oppositely disposed grooves 99 and 100 formed in the valve seat 90. The grooves 97 and 98 are, of course, movable with the plug member 91, but the grooves 99 and 100 are relatively stationary. The grooves 97 and 98 are arranged at points diametrically opposite to each other and substantially 90 degrees apart from the location of the grooves 99 and 100 and the movement of the valve 91 to bring the port 91a into or out of registration with the passageways 88 and 89 is limited to one direction for opening and one direction for closing, that is to say, the valve member can move only through 90 degrees of rotation from full open to full closed position, the valve being movable in the direction of the arrow 101 to close and in the direction of the arrow 102 to open, the valve being shown in the open position in the drawings with the port 91a aligned with the passageways 88 and 89.

It will be observed that in this arrangement of the grooves, none of the lubricant grooves are, at any time, in the operation of the valve, either in full open or full closed position, or in any of the intermediate positions, exposed to fluid in the passageways 88, 89 or in the port 91a for the reason that the grooves 95 and 96 are never in position to be exposed and the grooves 99 and 100 are always covered by the adjacent portion of the plug member, the grooves 97 and 98 being carried by the plug and being moved away from the passageways 88 and 89 in closing the valve and being positioned so that when the valve is in open position they are covered by a lap area of the valve seat. Suitable limit stop means, such as indicated at 103 on the gland 104, may be employed for preventing rotation of the valve member beyond its desired limits.

From an examination of Figures 9 and 10, it will be observed that in the full open position of the valve member there shown, a framing seal around the passageways 88 and 89 is afforded by the virtue of the lubricant contents in the grooves 95, 98, 96 and 100 on the right-hand side as viewed in Figures 9 and 10 and by virtue of the lubricant contents in the grooves 95, 96, 97 and 99 on the left-hand side as viewed in Figures 9 and 10. Even when the plug is in closed position, whereupon the grooves 98 and 99 come into substantial registration as well as the grooves 97 and 100, there is a framing seal around at least one of the passageways 88 and 89. Thus it will be understood that we are enabled to provide a lubricant seal around the passageways 88 and 89 in substantially all positions of the valve at all times and without the necessity of cutting off supply of lubricant from any of the grooves and without exposure of any of these grooves to the flow of fluid through the passageways 88 and 89.

It will be understood that in the forms of the invention shown in Figures 1, 6, 7 and 8 where the valve is to be a one direction valve in each case for opening or closing, that grooves may be employed in the plug member but that in instances where the limit stop is to be dispensed with, the grooves may take the form of the grooves 99 and 100 or may be in the form of ducts as indicated at 88b in Figure 7 and 80d in Figure 8.

Referring now to the form of the invention shown in Figure 11, we have here a detachable valve stem structure which is applicable to plug valves where the operating stem from time to time may necessarily be of different lengths or required to be separate from the valve.

Referring now to the form of the invention shown in Figure 11, here the plug member 104 is shown held in its seat 105 by flange member 106 bolted at 107 to the body 108 of the valve structure. In this instance it is sometimes desirable that a certain amount of play be allowed between the valve member and its operating stem indicated at 109. To this end the stem is provided with a squared enlargement 110 seating in a complemental recess 111 in the adjacent end of the valve member, the stem being provided with an annular radial flange 112 adjacent to the squared enlargement 110. Said flange 112 forms a bottom of the stuffing box in which a packing 113 is deposited, a gland 114 being mounted on the flange member 106 and retained by cap screws 115.

The stem 109 is preferably hollow where the valve is of the lubricated type and is provided with a tubular liner 16 which forms the lubricant chamber, this liner projecting beyond the outer end of the stem 109 and having a compressor screw 117 mounted therein.

The inner end of the liner 116 is in threaded engagement as in 118 with a suitable recess in the valve member and a suitable spring actuated check valve 119 is provided at the inner end of said liner 116.

The escape of fluid past the valve seat 105 and past the flange member 106 is prevented on the one hand by the packing 113 and on the other hand by the gasket 107a. However, these packings do not prevent leakage of fluid in the valve or of lubricant introduced to the surfaces of contact thereof past the enlarged squared portion 110 and up along the outside of the liner 116 between it and the stem 109. Therefore, we provide a stuffing box at the outer end of the stem surrounding the liner 116 in which a suitable packing 120 is deposited compressed in position by gland 121.

The packings provided in the stuffing boxes shown in Figure 1 and in other figures of the drawing, such as in Figure 11 are preferably composed of a structure best shown in Figure 12. This packing includes compressible and resilient portions wherein a resilient rubber center 122 is provided surrounded by the lubricating and compressible packing material in the form of annular members 123, 124 and 125, these latter elements being self lubricating. The resilient portion 122 is preferably composed of a compressed rubber core containing a plurality of intimately associated particles 126 of rubber, all so associated that they form a substantially homogeneous mass which we have found to be highly resilient and to possess long life. It is possible to employ the core 122 over long periods of time even during several renewals of the lubricating annular members 123, 124 and 125, the core retaining its resiliency and performing its function of holding the valve member on its seat over long periods of time.

In Figure 13 we have illustrated a form of the invention wherein the body 130 is provided with passages 131—131, and flow through said passages being controlled by a tapered plug 132 having a part 133 adapted to register with said passages.

The plug is provided with longitudinal lubricant grooves 134, 135, diametrically oppositely disposed and communicating with transverse or circumferential grooves 136 provided in the seating surface above and below said part, only one of said transverse grooves appearing. When the valve is in closed position as shown the grooves 134, 135 register with grooves 137 and 138 in the body or the seat. This valve so far is substantially like that of Figure 10. However, in order to provide a lubricant seal substantially entirely around the passages, and yet prevent exposure of any of the grooves to liquid flowing through the valve, we provide auxiliary longitudinal grooves 139 and 140 in the body or seat communicating with groove 136. The valve is limited to move 90° in direction of arrow C to open and when closing the valve the grooves 139 and 140 are so positioned that the port 133 does not reach the grooves 139, 140 while still in communication with the passages 131. See dotted line position 139a of port 133. Thus in going from open to closed position none of the grooves is exposed to flow through the valve, and yet in open or closed position seals are provided around the passages 131.

Having thus described my invention and illustrated its use, what I claim as new and desire to secure by Letters Patent is:

1. In an operating unit for valves and the like, in combination with the valve body and valve member, a valve retaining flange on said body, a gear housing, a gearing in said housing adapted to be connected to said valve, and common means for securing said flange and said housing to said valve body and permitting removal of the housing independently of the flange.

2. In an operating unit for valves and the like, in combination with the valve body and valve member, a valve retaining flange on said body, a gear housing, a gearing in said housing adapted to be connected to said valve, and common means for securing said flange and said housing to said valve body and permitting removal of the housing independently of the flange, and a compressible packing between said flange and valve member.

3. In an operating unit for valves and the like, in combination with the valve body and valve member, a valve retaining flange on said body, a gear housing, a gearing in said housing adapted to be connected to said valve, and common means for securing said flange and said housing to said valve body and permitting removal of the housing independently of the flange, and a resilient packing between said flange and valve member.

4. In an operating unit for valves and the like, in combination with the valve body and valve member, a valve retaining flange on said body, a gear housing, a gearing in said housing adapted to be connected to said valve, and common means for securing said flange and said housing to said valve body and permitting removal of the housing independently of the flange, and a compressible packing between said flange and valve member, and means for compressing said packing without disturbing said gear housing.

5. In a valve and operating mechanism, a casing having a passageway therethrough and a tapered valve seat, a plug valve member rotatably mounted to engage said seat, a stem upwardly projecting from said plug valve member, a valve retaining flange secured to said casing, a packing for the valve, a gland in said retaining flange for compressing said packing, a gearing engaging said stem for operating said valve, a housing for said gearing overlying said retaining flange, and means for securing said housing to said casing and permitting its removal therefrom independently of said retaining flange.

6. In a valve and operating mechanism, a casing having a passageway therethrough and a tapered valve seat, a plug valve member rotatably mounted to engage said seat, a stem upwardly projecting from said plug valve member, means for introducing lubricant under pressure to the seating surface between the plug and seat, a gland supporting flange on said casing, a packing for the valve, a gland on said supporting flange for compressing said packing, a gearing engaging said stem for operating said valve, a housing for said gearing, said gearing having an extension portion for connection to said valve permitting axial displacement of the latter by said lubricant pressure, and means for jointly supporting said housing and gland supporting flange on said casing.

7. In a valve and valve operating mechanism, a valve body having a tapered seat and a rotatable tapered valve member for engagement with said seat, transverse passageways in the body and a transverse port in said valve member, an external flange on said body, a valve retaining flange member on said valve body flange and abutting one end of the valve, a housing supported in spaced relation to said valve body on said external flange and being removable therefrom independently of said flange, and valve operating mechanism mounted in said housing and connected to said valve member.

8. In a valve and valve operating mechanism, a valve body having a tapered seat and a rotatable tapered valve member for engagement with said seat, transverse passageways in the body and a transverse port in said valve member, an external flange on said body, a valve retaining flange member on said valve body flange and abutting one end of the valve, a housing supported in spaced relation to said valve body on said external flange, and axially aligned with said valve member, a compound epicyclic gearing in said housing, a hand wheel on the outer portion of said housing for imparting movement to said gearing, and means forming a closure for the housing for connecting said gearing to said valve member.

9. In a valve and valve operating mechanism, in combination, a valve body having a valve seat and a rotatable valve member therein, a housing mounted on said valve body, a compound epicyclic gearing in said housing connected to operate said valve, said gearing including relatively movable ring gears and sets of planet gears connected thereto, an operating shaft extending beyond said housing, a sun gear on said shaft and engaging a set of said planet gears, said shaft having an enlarged end portion for retaining said sun and planet gears in operative position, and means for connecting said gearing to said valve member.

10. In a valve and valve operating mechanism, in combination, a valve body having a valve seat and a rotatable valve member therein, a housing mounted on said valve body, a compound epicyclic gearing in said housing connected to operate said valve, said gearing including relatively movable ring gears and sets of planet gears connected thereto, an operating shaft extending beyond said housing, a sun gear on said shaft and engaging a set of said planet gears, said shaft having an enlarged portion for retaining said sun and planet gears in operative position, and a member driven by said gearing, closing one end of said housing, and operatively connected to a part of said valve.

11. In a valve and valve operating mechanism, in combination, a valve body having a valve seat and a rotatable valve member therein, a housing mounted on said valve body, a compound epicyclic gearing in said housing connected to operate said valve, said gearing including relatively movable ring gears and sets of planet gears connected thereto, an operating shaft extending beyond said housing, a sun gear on said shaft and engaging a set of said planet gears, inner and outer supporting spiders for said sun and planet gears, said shaft having an enlarged portion engaging one of said spiders for retaining the same in operative position, and a member connected to said gearing, forming a closure for said housing and operatively connected to said valve member.

12. In a valve and valve operating mechanism, in combination, a valve body having a valve seat and a rotatable valve member therein, a housing mounted on said valve body, a compound epicyclic gearing in said housing connected to operate said valve, said gearing including relatively movable ring gears and sets of planet gears connected thereto, an operating shaft extending beyond said housing, a sun gear on said shaft and engaging a set of said planet gears, inner and outer supporting spiders for said sun and planet gears, said shaft having an enlarged portion engaging one of said spiders for retaining the same in operative position, and a member connected to said gearing, forming a closure for said housing, a sealing gasket between said closure member and said outer spider said closure member being connected to said valve member.

13. In a valve and valve operating mechanism, in combination, a valve body having a valve seat and a rotatable valve member therein, a housing mounted on said valve body, a compound epicyclic gearing in said housing connected to operate said valve, said gearing including relatively movable ring gears and sets of planet gears connected thereto, an operating shaft extending beyond said housing, a sun gear on the shaft and engaging a set of said planet gears, inner and outer supporting spiders for said sun and planet gears, said shaft having an enlarged end portion engaging one of said spiders for retaining the same in operative position, and a member connected to the valve member and carrying one of said ring gears.

14. In a valve and valve operating mechanism, in combination, a valve body having a valve seat and a rotatable valve member therein, a housing mounted on said valve body, a compound epicyclic gearing in said housing connected to operate said valve, said gearing including relatively movable ring gears, one of which is carried by the housing, and sets of planet gears connected thereto, an operating shaft extending beyond said housing, a sun gear on the shaft and engaging a set of said planet gears, inner and outer supporting spiders for said sun and planet gears, said shaft having an enlarged end portion engaging one of said spiders for retaining the same in operative position, and a member connected to the valve member and carrying one of said ring gears.

15. In a valve structure, a body having a tapered valve seat, a tapered valve member engaging said seat, a chamber in said valve structure adapted to contain plastic substance, means connecting said chamber with the surfaces of contact of the valve and its seat including an interrupted sinuated groove in said surfaces.

16. In a valve structure, a body having a tapered valve seat, a tapered valve member engaging said seat, a chamber in said valve structure adapted to contain plastic substance, means connecting said chamber with the surfaces of contact of the valve and its seat including an interrupted sinuated groove in said surfaces, and means in said chamber for placing the contents thereof and of said grooves under pressure.

17. In a valve structure, a body having a tapered valve seat, a tapered valve member engaging said seat, a chamber in said valve structure adapted to contain plastic substance, means connecting said chamber with the surfaces of contact of the valve and its seat including a plurality of interrupted transverse sinuated grooves in said surfaces and a longitudinal passageway in said valve structure connecting said grooves.

18. In a valve and valve operating mechanism, in combination, a casing having a passageway therethrough and a tapered valve seat, a plug valve member rotatably mounted and engaging said seat, a stem upwardly projecting from said plug valve member, a packing for the valve member, a gearing engaging said stem for operating said valve, a housing encompassing said gearing and being removable therewith as a unit, means for introducing lubricant under pressure to the surface of contact of the valve and its seat including transverse and longitudinal grooves in said surface of contact, and communication from said grooves to one end surface of said valve member for exerting lubricant pressure thereon.

19. In a valve and valve operating mechanism, in combination, a casing having a passageway therethrough and a tapered valve seat, a plug valve member rotatably mounted and engaging said seat, a stem upwardly projecting from said plug valve member, a packing for the valve member, a gearing engaging said stem for operating said valve, a housing encompassing said gearing, means for introducing lubricant under pressure to the surface of contact of the valve and its seat including sinuated grooves in the valve member and means also in said valve member for establishing communication between said sinuated grooves.

20. In a valve structure, a body member having a passageway therethrough and a valve chamber transverse to said passageway, a plug member seated in said chamber and means for lubricating the seating surfaces of said plug and body members including an interrupted sinuated lubricant groove in the seating surface of one of said members and extending substantially all around the upper portion of the other member, a lubricant reservoir in said plug, and a duct therefrom communicating with said circumferential groove in all positions of the plug.

21. In a valve structure, a body member having a passageway therethrough and a valve chamber transverse to said passageway, a plug member seated in said chamber and having a port adapted to register with said passageway and means for lubricating the seating surfaces of said plug and body members comprising diametrically opposite sinuated lubricant grooves in the seating surface of one of said members above said port and passageway terminating in spaced overlapping ends, means for continuously supplying lubricant under pressure to each of said grooves, and means for preventing communication through said grooves from one to the other.

22. In a valve structure, a body member having a passageway therethrough and a valve chamber transverse to said passageway, a plug member seated in said chamber and having a port adapted to register with said passageway and means for lubricating the seating surfaces of said plug and body members comprising diametrically opposite transverse sinuated lubricant grooves in the seating surface of one of said members above and below said port and passageway terminating in spaced overlapping ends, longitudinal lubricant grooves connecting the transverse grooves above the passageway with those therebelow, there being no communication between the transverse grooves above the passageway or between the transverse grooves therebelow, and means for continuously supplying lubricant under pressure to each of said grooves.

23. In a valve structure, a body member having a passageway therethrough and a valve chamber transverse to said passageway, a plug member seated in said chamber and having a port adapted to register with said passageway, an interrupted sinuated circumferentially disposed lubricant groove at one end of one of said members, and an interrupted sinuated circumferentially disposed lubricant groove at the other end of one of said members, the interruptions at one end being staggered relative to the corresponding interruptions at the other end.

24. In a valve structure, a body member having a passageway therethrough and a valve chamber transverse to said passageway, a plug member seated in said chamber and having a port adapted to register with said passageway, an interrupted sinuated circumferentially disposed lubricant groove at one end of one of said members, an interrupted sinuated circumferentially disposed lubricant groove at the other end of one of said members, and longitudinal grooves connecting the circumferential grooves at one end with those at the other, the interruptions of said circumferential grooves at each end of said members being located on alternate sides of the longitudinal grooves.

FRENCH HUGH MOREHEAD.
JESSE C. MARTIN, Jr.